Patented Dec. 10, 1940

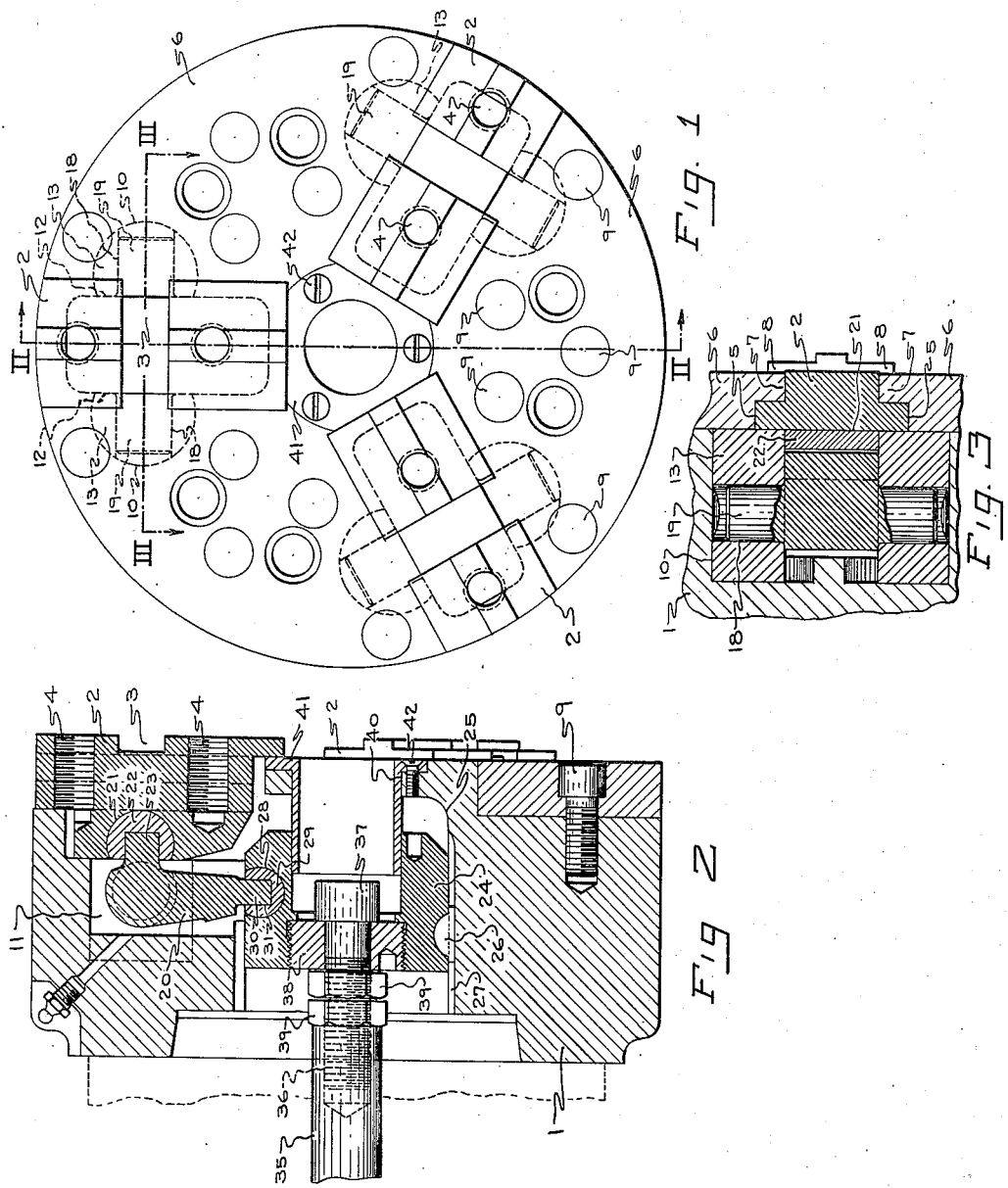

2,224,639

UNITED STATES PATENT OFFICE 2,224,639

CHUCK STRUCTURE

Loyd A. Ward, Jackson, Mich., assignor to Tomkins-Johnson Company, Jackson, Mich., a corporation of Michigan Application March 8, 1939, Serial No. 260,522

6 Claims. (Cl. 279—119)

This invention relates to power chucks and more particularly to power chucks, the jaws of which are actuated by pivoted levers.

In chucks of the character to which this invention relates, there has always been a serious problem presented in the pivotally supporting of the levers for actuating the jaws. The cost of manufacture of heretofore known chucks having pivoted levers for actuating the jaws has been great and the levers and assoicated moving parts have been accessible, for the purpose of replacements and repairs, only with difficulty. Furthermore, prior structures have not been substantial enough to withstand the large forces exerted when actuated by hydraulic mechanism for holding relatively large work in multiple tool machines. According to the present invention, the heretofore known difficulties have been overcome by the provision of a chuck provided with removable face plates which not only provide ways for the chuck jaw holding members but also retain the jaw actuating levers and associated parts in assembled relation. The chuck structure and face plates are so arranged that upon removal of the face plates, the jaw holding members, the actuating levers for the jaw holding members and their pivotal supports may be freely removed from the structure.

Accordingly, an object of the invention is to provide a chuck structure of the type described having removable face plates. Another object of the invention is to provide chuck structure of the character described with jaw actuating levers and their pivotal supports, removable from one side of the chuck body.

A further object of the invention is to provide a chuck of the character described, having removable bearing blocks for pivotally supporting the jaw actuating lever pivots, for permitting the assembly and disassembly of the lever from one side of the chuck.

A still further object of the invention resides in the novel construction and arrangement of the parts permitting economical manufacture and ready disassembly for replacements or repairs.

These and other objects will be apparent from the following specification when taken with the accompanying drawing, in which Fig. 1 is an end elevation showing a chuck according to the present invention equipped with jaw holders but with the jaws removed, Fig. 2 is a section of the line II—II of Fig. 1, and Fig. 3 is a section of the line III—III of Fig. 1.

Referring particularly to the drawing, the reference character 1 indicates the body of the chuck. The body 1 is provided with three jaw holders 2 shown in each of the figures and in cross-section in Fig. 3. The jaw holders 2 are each provided with a slot 3 and tapped bores 4, by means of which a jaw of any desired character may be secured. Each jaw holder 2 is slidable in ways 5, provided by the surface of the body 1, and removable face plates 6 having overhanging portions 7, as will be clear particularly from Fig. 3. Each jaw holder 2 is provided with portions 8 overhanging adjacent face plates 6. The face plates 6 are three in number and are secured to the face of the body 1 by screws 9.

In the body 1 there is a plurality of pairs of recesses 10, one pair for each jaw holder 2. Each recess 10 of a pair associated with a jaw holder 2 is disposed on the opposite sides of an internal chamber 11, shown particularly in Fig. 2, and each recess 10 has a restricted opening 12 into the chamber 11. The recesses 10 preferably are in the form of cylindrical bores having a side opening into the chamber 11 to provide the restricted opening 12, and an end opening toward the face plates 6. Disposed within each recess 10 is a block 13. The blocks 13 are in the form of cylindrical bars having one side thereof cut off so that when disposed in a recess 10 the sides are flush with the openings 12 and also the walls of the chambers 11 as shown particularly in Fig. 1.

Each block 13 is bored to provide a bearing 18 for receiving a journal pin 19 of a bell crank lever 20. As shown particularly in Figs. 1 and 3, each bell crank lever 20 is provided with a journal pin 19 on opposed sides, about which each lever 20 may be rocked to actuate a jaw holder 2.

An operative connection between each lever 20 and its associated jaw holder 2 is provided by an open-sided journal bearing 21 having a cross pin 22 disposed therein for rocking movement, snugly receiving a squared projection 23, constituting one arm of the bell crank lever 20.

Each bell crank lever 20 is rocked about its journal pins 19 by a draw sleeve 24, slidable in a bore 25 in the body 1 and maintained therein against rotation by a key 26 sliding in a keyway 27 in the body 1. The draw sleeve 24 is provided with open-sided journal bearings 28 similar to the journal bearings 21 and having rockable therein cross pins 29 similar to the cross pins 22. It will be understood that there is an open-sided journal bearing 28 having a cross pin 29 for each bell crank lever 20. The other arm of each bell crank lever 20 is provided with a squared projection 30 snugly engaging with a recess 31 in its associated cross pin 29.

The draw sleeve 24 is actuated through a rod 35 which is in turn actuated by a pneumatic, hydraulic or other operating structure not shown. The rod 35 has in the end thereof a threaded bore 36 into which is threaded a socket headed bolt 37 freely passing through an externally threaded nut 38, threaded into the draw sleeve 24. On the shank of the bolt 37 are clamped together two nuts 39 on the opposite side of the nut 38 from the head of the bolt 37. The nuts 39 are positioned as to leave a slight clearance between them and the nut 38 to permit free rotation of the nut 38. The bolt 37 may then be threaded into the bored end of the rod 35, clamping the end of the rod 35 against one of the nuts 39 to lock the rod 35 and the bolt 37 together.

Access to the head of the bolt 37 is provided by a bore 40 in the body 1. Within the bore 40 is disposed a pilot bushing 41 secured to the body 1 by screws 42. The pilot bushing 41 does not comprise a part of this invention and its use will be well understood by those skilled in the art.

The operation of the invention is as follows:

Assuming that suitable jaws have been secured to the jaw holders 2, the actuating rod 35 is moved to the right as viewed in Fig. 2 of the drawing, pivoting the bell crank levers 20 about their journal pins 19, disposed in the bearings 18 in the blocks 13. This movement slides the jaw holders 2 outwardly in their ways 5, thus opening the jaws for receiving work. In order to clamp work in the jaws, the actuating rod 35 is moved to the left as viewed in Fig. 2 with the result that the bell crank levers 20 are pivoted in the opposite direction to move the jaw holders 2 together with the jaws held therein, inwardly to clamp therebetween the work.

In order to disassemble the chuck according to the present invention, it is merely necessary to remove the face plates 6. The jaw holders 2 and the blocks 19 and the levers 20 may be then readily lifted out. Any of the removed structure may then be repaired or replaced and the chuck reassembled in the reverse order.

From the foregoing description it will be apparent that the present invention makes possible a simple, rugged, and inexpensive structure wherein the problem of pivotally mounting the bell crank levers 20 in such manner that they and their bearings are readily removable for replacement or repair is reduced to a minimum. In the appended claims the term jaw member is used. This is to be taken as broad enough to define the jaw holders 2, with or without jaws secured thereto.

Having thus described my invention, what I desire to secure by Letters Patent and claim is:

1. In a chuck, a body, actuating means extending from one end thereof axially of said body, said body having recesses extending axially thereof and opening toward the other end of said body, radially movable jaw members mounted in covering relation to said recesses, moving mechanism for said jaw members located in said recesses, means in said recesses mounting said moving mechanism, a separable operative connection between said actuating means and said moving mechanism for moving said jaw members, said moving mechanism and its mounting means being maintained in assembled relation in said body by said jaw members, and means to maintain said jaw members in assembled relation to said body.

2. In a chuck, a body, actuating means for the chuck, said body having recesses extending axially thereof and opening toward one end of said body, radially movable jaw members disposed in covering relation to said recesses, face plates removably secured to said body providing ways for said jaw members, moving mechanism for said jaw members located in said recesses, means in said recesses mounting said moving mechanism, and an operative connection between said actuating means and said moving mechanism for moving said jaws, said moving mechanism, its mounting means and jaw members being held in assembled relation in said body by said face plates.

3. In a chuck, a body, actuating means for said chuck, said body having a plurality of recesses therein, extending axially thereof and opening toward one end thereof, jaw members mounted in covering relation to said recesses, a lever mounted in each recess, a pair of spaced axially removable bearing blocks in each recess, one block being opposite each side of each lever, respectively, means for rockably supporting said levers supported by said bearing blocks, respectively, operative connections between said jaw members and said levers, an operative connection between said actuating means and said levers for rocking the same to move said jaw members, and face plates removably secured to said body, for defining the path of movement of said jaw members and for holding said jaw members, levers and bearing blocks in assembled relation in said body, whereby upon removal of said face plates, said jaw members, levers and bearing blocks may be removed from said body.

4. In a device of the character described, a body, a chamber therein, a pair of spaced open-sided recesses in said body opening on said chamber, a block disposed in each recess, each block having a bearing therein, a lever in said chamber having a transverse journal pin, said pin having the ends thereof journalled in said bearings mounting said lever for pivotal movement, a jaw member way in said body, a jaw member in said way, removable face plates on said body at opposite sides of said jaw member, limiting said jaw member against outward movement, each face plate being disposed over one of said blocks to hold it in its recess, an operative connection between said lever, said jaw member, and means for actuating said lever to actuate said jaw member.

5. In a chuck, a body, jaw actuating levers, a plurality of radially extending chambers therein, for receiving said jaw actuating levers, said body having a recess on each side of said chamber, each recess opening laterally into said chamber and extending axially of said body, being open toward the outer end of said chamber, bearing blocks disposed in said recesses, journal pins associated with said levers and mounted in said bearing blocks respectively, for pivotally supporting said levers in said chambers, means for rocking said levers about said pins, jaw members slidably mounted on said body in covering relation to said chambers respectively, face plates on said body disposed between said jaw members and providing ways for said jaw members limiting their movements to being radial, and in operative connection between said levers and said jaw members respectively, whereby said jaw members are actuated upon actuation of said lever rocking means.

6. In a chuck wherein a plurality of jaw members slidable in ways are moved into and out of operative relation by an actuating member working through a pivoted lever for each jaw member, a body, said body having therein a plurality of pairs of spaced recesses, one pair for each lever, a block in each recess, said recesses having opposed restricted openings in adjacent sides thereof, said blocks having bearings in the portions thereof facing said opposed openings, pins journalling each lever in a pair of opposed bearings, and removable face plates on said body, said face plates bearing against said body over said blocks and holding said blocks in said body, said face plates also providing ways for said jaw members, whereby said bearing blocks and jaw members may be assembled in said body from one side thereof and maintained therein by said face plates.

LOYD A. WARD.